US008619247B1

United States Patent
Scaggs

(10) Patent No.: US 8,619,247 B1
(45) Date of Patent: Dec. 31, 2013

(54) LASER BEAM ANALYSIS APPARATUS

(75) Inventor: Michael J. Scaggs, Weston, FL (US)

(73) Assignee: Haas Laser Technologies, Inc., Flanders, NJ (US)

( * ) Notice: Subject to any disclaimer, the term of this patent is extended or adjusted under 35 U.S.C. 154(b) by 0 days.

(21) Appl. No.: 13/534,174

(22) Filed: Jun. 27, 2012

Related U.S. Application Data

(63) Continuation-in-part of application No. 12/756,476, filed on Apr. 8, 2010, now Pat. No. 8,237,922.

(51) Int. Cl.
*G01J 1/00* (2006.01)

(52) U.S. Cl.
USPC .......................................... 356/121; 356/138

(58) Field of Classification Search
USPC ................. 356/121, 225, 234, 6, 138, 122; 359/856–857; 219/121.61, 212.62; 372/92
See application file for complete search history.

(56) References Cited

U.S. PATENT DOCUMENTS

| | | | |
|---|---|---|---|
| 4,384,198 A * | 5/1983 | Williamson | ............... 250/203.1 |
| 5,064,284 A | 11/1991 | Johnston, Jr. et al. | |
| 5,069,527 A | 12/1991 | Johnston, Jr. et al. | |
| 5,078,491 A | 1/1992 | Johnston, Jr. | |
| 5,100,231 A | 3/1992 | Sasnett et al. | |
| 5,214,485 A | 5/1993 | Sasnett et al. | |
| 5,267,012 A | 11/1993 | Sasnett et al. | |
| 5,329,350 A | 7/1994 | Wright et al. | |
| 5,459,565 A | 10/1995 | Aharon | |
| 6,313,910 B1 | 11/2001 | Garvey et al. | |
| 8,237,922 B2 * | 8/2012 | Scaggs | .......................... 356/121 |
| 2005/0220163 A1 * | 10/2005 | Okuta et al. | .................... 372/92 |
| 2007/0297483 A1 * | 12/2007 | Wakabayashi et al. | ......... 372/97 |
| 2008/0165320 A1 | 7/2008 | Heiberger | |

FOREIGN PATENT DOCUMENTS

| | | | |
|---|---|---|---|
| JP | 59079122 A | 5/1984 | |
| JP | 2002176007 A | 6/2002 | |

OTHER PUBLICATIONS

International Search Report with a mail date of Jan. 2, 2012 for corresponding international patent application No. PCT/US2011/031776 with an international filing date of Apr. 8, 2011.

* cited by examiner

*Primary Examiner* — Tri T Ton
(74) *Attorney, Agent, or Firm* — Ronald E. Smith; Smith & Hopen, P.A.

(57) ABSTRACT

An apparatus having a linear structure that enables real time measurement of the spatial profile, circularity, centroid, astigmatism and M2 values of a laser beam generated by a low power laser beam. A laser beam source transmits a laser beam through a focusing lens, a Fabry-Perot resonator, a pair of polarizers and a camera that detects spots of light that pass through the first and second mirrors and the polarizers. The resonator includes a pair of high reflecting mirror plates disposed in parallel, spaced apart relation to one another at a common angle of incidence to the laser beam. The polarizers are disposed at an opposite angle of incidence and are rotationally adjustable to enable intensity adjustment of the camera.

4 Claims, 1 Drawing Sheet

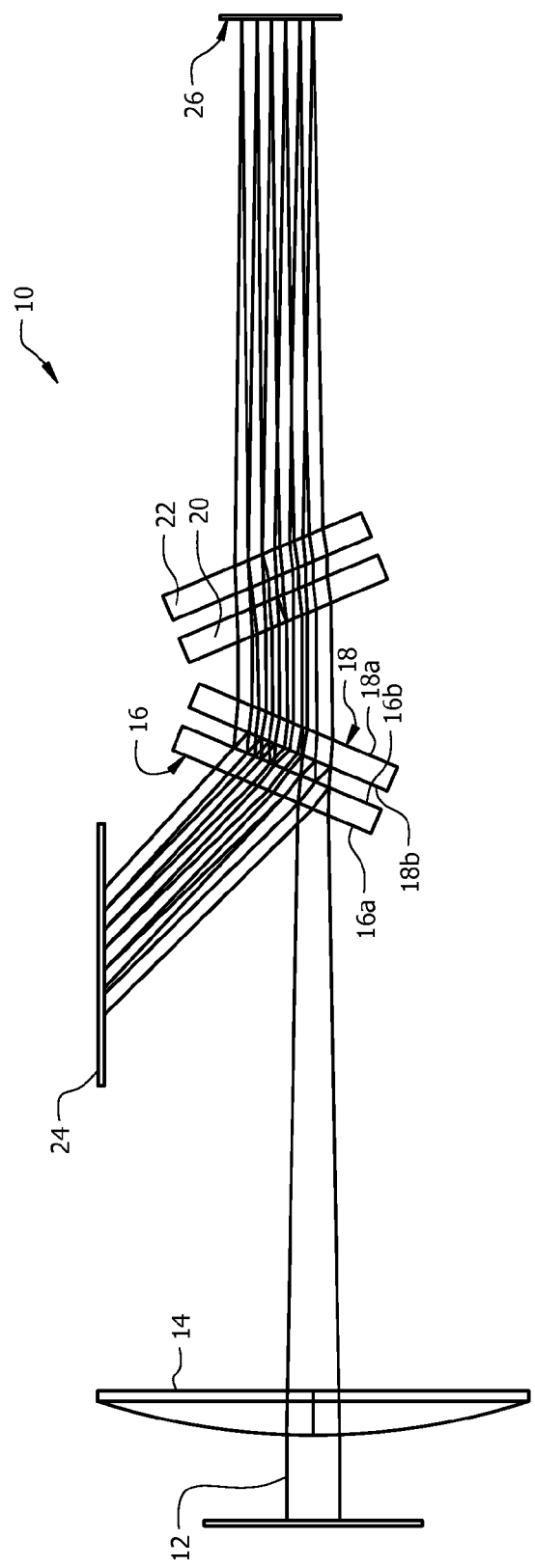

LASER BEAM ANALYSIS APPARATUS

CROSS-REFERENCE TO RELATED APPLICATIONS

This application is a continuation-in-part of and claims priority to application Ser. No. 12/756,476, entitled Laser Beam Analysis Apparatus, filed Apr. 8, 2010 by the same inventor, which application is hereby incorporated by reference into this application.

BACKGROUND OF THE INVENTION

1. Field of the Invention

This invention relates, generally, to the art of analyzing laser beams. More particularly, it relates to the art of analyzing low power laser beams.

2. Description of the Prior Art

A conventional apparatus for analyzing a low power laser beam includes a rotating needle that acts like a knife edge. The rotating needle reflects a small sampling of the focused laser beam into a detector. The needle, as it is rotated, moves along an optical axis and measures the beam waist of a focused laser beam.

Multiple patents, such as U.S. Pat. Nos. 5,064,284, 5,069,527, 5,078,491, 5,100,231, 5,214,485, 5,267,012 and 5,459,565, disclose methods of analyzing a multimode laser beam by passing it through a rotating knife edge followed by translating the focal point along the optical axis to a detector.

Prior art devices in this field are bulky and require many moving parts. They do not facilitate quick and real time analysis of the laser beam.

U.S. Pat. No. 5,329,350 discloses a method for analyzing a laser beam by attenuating the beam with a pair of wedges and a second attenuation assembly. The light is then passed through a lens and a series of partially reflective plates where the number of beams produced is two times the number of partially reflecting plates used and then directs the beam onto a detector to view multiple spots simultaneously.

This method requires multiple optics and is generally limited to analyzing a laser beam with a long focal length lens. This limitation exists because stacking a series of plates limits the beam waist that can be measured and makes it difficult to fabricate thin plates that permit analyzing a beam with a focal length much less than about three hundred millimeters (300 mm).

The earlier inventions disclosed in the above-mentioned patents are not capable of analyzing the beam using all the optical components of a conventional material processing system. The prior art devices also require the laser beam to be measured off line.

U.S. Pat. No. 6,313,910 discloses a rotation of apertures that are displaced along the optical axis of the beam waist to be analyzed. This device is rather compact and permits a more real time measurement, but includes moving parts that slow the measurement process.

Thus there is a need for an apparatus for analyzing low power laser beams that is small and free of moving parts, has a small number of optics, uses the optical components of a conventional material processing system, and attenuates the beam in an acceptable manner so that the beam can be measured in situ.

However, in view of the art considered as a whole at the time the present invention was made, it was not obvious to those of ordinary skill in the art how the limitations of the art could be overcome.

SUMMARY OF THE INVENTION

The long-standing but heretofore unfulfilled need for a compact apparatus having no moving parts that analyzes laser beams on line in real time is now met by a new, useful, and non-obvious invention.

The novel apparatus that enables analysis of a laser beam emitted from a laser beam source includes a Fabry-Perot resonator including a first mirror having an anti-reflection coating on a first surface thereof that faces the source of the laser beam and a non-absorbing, highly reflective coating that transmits less than one percent (1%) of said laser beam on a second surface thereof that faces away from the source.

The Fabry-Perot resonator further includes a second mirror having an anti-reflection coating on a second surface thereof that faces away from the source and a non-absorbing, highly reflective coating that transmits less than one percent (1%) of said laser beam on a first surface thereof that faces the source.

The respective non-absorbing, highly reflective coatings of the first and second mirrors are thus understood to face one another.

The first and second mirrors are disposed in spaced apart, parallel, and axial alignment relation to one another in a path of travel of the laser beam.

Moreover, the first and second mirrors are tilted relative to the laser beam at an angle greater than zero degrees and less than five degrees.

A focusing lens is disposed between the laser beam source and the Fabry-Perot resonator.

A pair of polarizers is positioned between the mirror plates that form the Fabry-Perot resonator and a pixelated detector that detects spots of light that pass through the focusing lens, the Fabry-Perot resonator, and the polarizers.

The focusing lens, Fabry-Perot resonator, polarizers, and the pixelated detector are in axial alignment with one another in the propagation path of the laser beam. The focusing lens is positioned closest to the laser beam source, the pixelated detector is positioned furthest from the laser beam source, the Fabry-Perot resonator is disposed between the focusing lens and the polarizers and the polarizers are disposed between the Fabry-Perot resonator and the pixelated detector.

The laser beam is therefore substantially attenuated and the transmitted light is spatially offset laterally and time delayed with each round trip in the Fabry-Perot resonator so that it can be analyzed by the pixelated detector.

The novel apparatus enables real time measurement and analysis of the spatial profile, circularity, centroid, astigmatism and $M^2$ (M-squared) values of a laser beam generated by a laser.

The novel apparatus employs a minimum number of optics to provide a plurality of focused laser spots. Each spot represents a part of the focused beam waist of interest. Each spot impinges onto a single CCD, CMOS, microbolometer array or any other pixelated detector or camera. The apparatus therefore provides real time data on the laser's beam properties.

The pixilated detector is provided in the form of a charge-coupled device, a complementary metal oxide semiconductor, microbolometer array or the like.

A primary object of this invention is to measure a low power (ten watts or less) laser beam in situ with a conventional material processing system used for cutting, drilling, scribing, marking, welding or other treatment.

Another object is to provide an apparatus having no moving parts.

Another important objective is to minimize the number of optical elements in a beam waist analyzer.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawing, in which:

The FIGURE is a diagram of the novel apparatus.

DETAILED DESCRIPTION OF THE PREFERRED EMBODIMENT

Referring now to FIG. 1, it will there be seen that a diagrammatic representation of the novel apparatus is denoted as a whole by the reference numeral 10.

The novel structure disclosed herein includes a laser beam having less than ten (10) watts of power. The laser beam may enter the novel structure directly from a laser. In the alternative, if a more powerful laser is to be evaluated, the laser beam may enter the novel structure as a first surface attenuated reflection from an uncoated wedged optic or from an anti-reflection coated wedged optic.

Laser beam 12 first passes through focusing lens 14. Said focusing lens is tilted at zero degrees (0°) relative to the propagation path of laser beam 12.

Laser beam 12 then passes through first and second mirrors 16 and 18 which are parallel to one another and collectively oriented at a nominal tilt of less than five degrees (5°) relative to laser beam 12. The depicted tilt is exaggerated.

Surface 16a of first plate 16 is highly anti-reflective coated and second surface 16b of first mirror plate 16 is high-reflection coated. Surface 18a of mirror plate 18 is highly anti-reflective coated and surface 18b is high-reflection coated.

The spacing between mirrors 16, 18 is adjustable from about fifty (50) microns to more than six millimeters (6 mm). Mirrors 16 and 18 collectively form a Fabry-Perot resonator. A working prototype has a spacing from zero to six millimeters (0-6 mm) but this distance can be increased depending upon the application. A focus Rayleigh length of twelve millimeters (12 mm) may be provided due to the round trip nature of the spatial slices. Twelve millimeters (12 mm) is a very long range in this environment. The spacing is not limited to a maximum of six millimeters but additional spacing can be added to accommodate longer Rayleigh lengths.

The majority of light reflecting from mirrors 16 and 18 is re-directed to beam dump 24 and the light that passes through all four optics lands on a pixelated detector or camera 26. About ninety nine percent (99%) of all light from source 12 is reflected to beam dump 24. About one percent (1%) passes through mirror 16 and then only about one percent (1%) of that one percent (1%) passes through mirror 18 in the non-reflected path. Thus, about ninety-nine percent (99%) of the one percent (1%) stays within the mirror pair 16, 18, i.e., only about one percent (1%) of one percent (1%) reaches camera 26. These percentages are approximations and are not critical to the invention.

Polarizers 20, 22 are tilted in a direction opposite to the tilt of mirror plates 16, 18. The tilt of the Fabry-Perot optics (16 and 18) is critical but the tilt of the polarizing pairs (20, 22) is not. Polarizers 20, 22 can be provided in the form of a pair of wire grid plates, a thin film polarizer, polarizing cubes, and the like.

Polarizers 20, 22 are depicted at nominally five degrees (5°) in opposition to mirrors 16 and 18. However, they are tilted at five degrees (5°) in an opposing axis, i.e., if the plane of the paper is Y, Z as depicted, then polarizers 20, 22 are tilted five degrees (5°) about the Y axis and not the X axis as depicted. This helps minimize astigmatism as is well known by those skilled in the art. As depicted, the structure has utility because the small angles involved do not introduce noticeable astigmatism.

The nominal tilt is five degrees (5°) and that angle can be adjusted by about two degrees (2°) in either direction. Increased optical interference arises as polarizers 20, 22 approach a zero degree (0°) angle of incidence and such interference can wash out a meaningful measurement. The angle must be greater than zero degrees (0°) to prevent interference and less than about five degrees (5°) to prevent significant astigmatism.

Rotation of one or both of polarizing plates 20, 22 about the optical axis provides a fine adjustment of the intensity of the laser beam on the pixelated detector, such rotation further reducing intensity by a factor of about three hundred (300).

Polarizing plates 20, 22 do not need to be parallel to one another. It is better that they not be parallel because that could cause some optical interference. Polarizers 20, 22 are anti-reflection coated to avoid or minimize possible optical interference.

Polarizing plates 20, 22 may be spaced far apart and any spacing will work. The spacing of the polarizers is not important and is only set by mechanical convenience and is fixed. At least one of the polarizers must be rotatable to be rotated about the optical axis for intensity adjustment as aforesaid.

The polarizers provide minimum transmission when cross polarized and maximum transmission when in parallel polarization.

The light that passes through polarizers 20, 22 is directed onto a suitable CCD, CMOS, microbolometer array or other pixelated detector 26 as aforesaid to monitor a series of focal spots that are separated by a certain distance determined by the angle of mirrors 16, 18 and the air gap between highly reflective surfaces 16b, 18b.

The spatial time delay delta of each consecutive spot along the optical axis is based upon the equation $2(d/\cos \alpha)$ where d is the air spacing between mirrors 16, 18 and $\alpha$ is the incident angle of the light on the mirror. The spatial time delay delta between spots on the detector decreases as spacing d decreases, thereby providing higher resolution of the beam waist measurement.

All of the multiple spots incident on pixelated detector or camera 26 are analyzed with commercially available software to determine the waist of laser beam 12 at the focus of the lens of camera 26. The position of camera 26 is set where the smallest spot is in the middle of the series of spots.

Novel system 10 can have a very large number of spots on camera 26, limited only by the detector size and the angle of mirror pair 16, 18. If the incident angle of the light on the mirror pair is too small, it can create a condition where the light interferes with itself. The separation and angle of the mirrors is therefore adjusted to prevent such interference.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus that enables analysis of a laser beam emitted from a laser beam source, comprising:
   a Fabry-Perot resonator including a first mirror having an anti-reflection coating on a first surface thereof that faces said source of said laser beam and a non-absorbing, highly reflective coating that transmits less than one percent (1%) of said laser beam on a second surface thereof that faces away from said source;
   said Fabry-Perot resonator including a second mirror having an anti-reflection coating on a second surface thereof that faces away from said source and a non-absorbing, highly reflective coating that transmits less than one percent (1%) of said laser beam on a first surface thereof that faces said source;
   said first and second mirrors disposed in spaced apart, parallel, and axial alignment relation to one another in a path of travel of said laser beam, said first and second mirrors being tilted relative to said laser beam at an angle greater than zero degrees and less than five degrees;
   a pair of polarizers disposed in spaced apart, parallel, and axial alignment relation to one another in a propagation path of said laser beam, said pair of polarizers being tilted relative to said laser beam at an angle greater than zero degrees and less than five degrees;
   a focusing lens disposed between said laser beam source and said Fabry-Perot resonator;
   a pixelated detector for detecting spots of light that pass through said focusing lens, said Fabry-Perot resonator, and said polarizers;
   said focusing lens, said Fabry-Perot resonator, said polarizers, and said pixelated detector being in axial alignment with one another in said propagation path of said laser beam, said focusing lens being closest to said laser beam source, said pixelated detector being furthest from said laser beam source, said Fabry-Perot resonator being disposed between said focusing lens and said polarizers and said polarizers being disposed between said Fabry-Perot resonator and said pixelated detector;
   said laser beam being substantially attenuated and the transmitted light being spatially offset laterally and time delayed with each round trip in the Fabry-Perot resonator so that it can be analyzed by said pixelated detector;
   at least one polarizer of said pair of polarizers being rotationally adjustable to enable intensity adjustment of said pixelated detector;
   said polarizers providing minimum transition when cross polarized and providing maximum transmission when in parallel polarization.

2. The apparatus of claim 1, further comprising:
said first and second mirrors having a space between them that is adjustable from about fifty (50) microns to about six (6) millimeters.

3. The apparatus of claim 1, further comprising:
said first and second mirrors having a space between them that is adjustable to any spacing greater than about fifty (50) microns.

4. The apparatus of claim 1, further comprising:
a beam dump that is not in said propagation path;
said beam dump collecting about ninety-nine percent (99%) of light emitted by said laser.

\* \* \* \* \*